(12) United States Patent
Kim

(10) Patent No.: US 8,877,370 B2
(45) Date of Patent: Nov. 4, 2014

(54) BATTERY PACK HAVING A SENSOR A GAS SENSOR IN THE CAP ASSEMBLY

(75) Inventor: Youn-Gu Kim, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 495 days.

(21) Appl. No.: 13/234,574

(22) Filed: Sep. 16, 2011

(65) Prior Publication Data

US 2012/0121942 A1 May 17, 2012

Related U.S. Application Data

(60) Provisional application No. 61/413,044, filed on Nov. 12, 2010.

(51) Int. Cl.
H01M 2/08 (2006.01)
H01M 2/04 (2006.01)
H01M 10/42 (2006.01)
H01M 2/34 (2006.01)
H01M 10/48 (2006.01)
H01M 2/36 (2006.01)
H01M 10/44 (2006.01)
H01M 10/0525 (2010.01)

(52) U.S. Cl.
CPC ............ H01M 10/48 (2013.01); H01M 2/0426 (2013.01); H01M 10/0525 (2013.01); H01M 10/4257 (2013.01); H01M 2/34 (2013.01); H01M 2010/4271 (2013.01); H01M 2/361 (2013.01); H01M 10/44 (2013.01); H01M 2200/00 (2013.01); Y02E 60/12 (2013.01); H01M 2200/106 (2013.01)
USPC .......................................... 429/185; 429/163

(58) Field of Classification Search
USPC .............................................................. 429/7
See application file for complete search history.

(56) References Cited

U.S. PATENT DOCUMENTS

| 5,705,290 | A | 1/1998 | Azema | |
| 6,664,000 | B1 * | 12/2003 | Sonobe | 429/61 |
| 2005/0255381 | A1 * | 11/2005 | Shen et al. | 429/185 |
| 2006/0134511 | A1 | 6/2006 | Ito et al. | |

(Continued)

FOREIGN PATENT DOCUMENTS

| JP | 06111857 A * | 4/1994 |
| JP | 10-12284 A | 1/1998 |
| JP | 2009-205913 A | 9/2009 |
| JP | 2009-216570 A | 9/2009 |

OTHER PUBLICATIONS

Machine English translation of JP 06111857 A to Nitta.*

Primary Examiner — Patrick Ryan
Assistant Examiner — Lucas J O Donnell
(74) Attorney, Agent, or Firm — Robert E. Bushnell, Esq.

(57) ABSTRACT

A battery having a can containing an electrode assembly and an electrolyte and a cap assembly with a cap plate having an electrolyte injection unit, the cap plate is coupled to the can and an upper cover is coupled to the cap plate. The battery further includes a gas sensor located within the cap assembly to detect leakage of the electrolyte into the cap assembly and a protective circuit module mounted to the upper cover and electrically coupled to the gas sensor, the protective circuit module is adapted to stop a charge/discharge operation of the battery and discharge the battery upon receipt of a signal from the gas sensor indicating detection of leakage of the electrolyte into the cap assembly.

20 Claims, 11 Drawing Sheets

(56) References Cited

U.S. PATENT DOCUMENTS

2007/0229294 A1* 10/2007 Vossmeyer et al. ...... 340/636.19
2009/0085519 A1 4/2009 Kim
2010/0102975 A1 4/2010 Vossmeyer et al.

* cited by examiner

BATTERY PACK HAVING A SENSOR A GAS SENSOR IN THE CAP ASSEMBLY

CLAIM OF PRIORITY

This application claims priority to and the benefit of Provisional Application No. 61/413,044, filed on Nov. 12, 2010, in the United States Patent and Trademark Office, the entire content of which is incorporated herein by reference.

BACKGROUND THE INVENTION

1. Field of the Invention

The general inventive concept generally relates to a battery pack, and more particularly, to a battery pack containing an electrolyte.

2. Description of the Related Art

Due to the development of technologies on and the increase in production of mobile devices such as mobile phones and laptop computers, secondary batteries are highly demanded as an energy source. Currently, research is actively conducted on an alternative energy source for replacing fossil fuel and to be used in electric and hybrid vehicles.

The above information disclosed in this Related Art Section is only for enhancement of understanding of the background of the invention and therefore it may contain information that does not form the prior art that is already known to a person of ordinary skill in the art.

SUMMARY OF THE INVENTION

One or more exemplary embodiments of the present invention include a battery pack capable of promptly and accurately sensing a leakage of an electrolyte.

One or more exemplary embodiments of the present invention include a battery pack capable of performing a protection operation according to a leakage of an electrolyte.

According to an exemplary embodiment of the present invention, a battery having a can containing an electrode assembly and an electrolyte and a cap assembly with a cap plate having an electrolyte injection unit, the cap plate may be coupled to the can and an upper cover may be coupled to the cap plate. The battery may include a gas sensor located within the cap assembly to detect leakage of the electrolyte into the cap assembly and a protective circuit module mounted to the upper cover and electrically coupled to the gas sensor, the protective circuit module may be adapted to stop a charge/discharge operation of the battery and discharge the battery upon receipt of a signal from the gas sensor indicating detection of leakage of the electrolyte into the cap assembly.

An aspect of the present invention battery provides for the gas sensor to may be a pressure sensor that detects a leakage of the electrolyte into the cap assembly by detecting an increase in vapor pressure in the cap assembly caused by the leakage of the electrolyte into the cap assembly.

An aspect of the present invention battery provides for the gas sensor detects a leakage of the electrolyte into the cap assembly by a change in resistance or electric capacity of the gas sensor caused by contact of the electrolyte with the gas sensor.

Another aspect of the present invention battery provides for the protection circuit module to further include a circuit substrate having a plurality of external connection terminals on an upper surface of the circuit substrate that protrude through a plurality of terminal holes in the upper cover; and a protection device coupled to a lower surface of the circuit substrate. The gas sensor may be affixed to the lower surface of the circuit substrate immediately above the electrolyte injection unit of the cap plate.

Another aspect of the present invention battery provides for the gas sensor to be coupled to a surface of the cap plate immediately adjacent to the electrolyte injection unit.

Another aspect of the present invention battery provides for the protection circuit module to further include a circuit substrate having a plurality of external connection terminals on an upper surface of the circuit substrate that protrude through a plurality of terminal holes in the upper cover; and a protection device coupled to a lower surface of the circuit substrate. The gas sensor may be affixed to the lower surface of the circuit substrate immediately above an electrode terminal that protrudes through the cap plate, said electrode terminal may be connected to a negative tap that may be connected to the electrode assembly.

Another aspect of the present invention battery provides for the can to be a case that may be flexible and includes an upper case and a lower case which are sealed to contain the electrode assembly and electrolyte, a positive tap and a negative tap that may be connected to the electrode assembly protrude from the case.

Another aspect of the present invention battery provides for the protection circuit module to further include a circuit substrate; a protection device coupled to a lower surface of the circuit substrate; a first terminal affixed to the lower surface of the circuit substrate and electrically connected to the positive tap; and a second terminal affixed to the lower surface of the circuit substrate and electrically connected to the negative tap. The gas sensor may be composed of a pair of gas sensors affixed to the lower surface of the circuit substrate in which one of the pair of gas sensors may be immediately adjacent to the first terminal and another of the pair of gas sensors may be immediately adjacent to the second terminal.

Another aspect of the present invention battery provides for the protection circuit module further includes a circuit substrate; a protection device coupled to a lower surface of the circuit substrate; a first terminal affixed to the lower surface of the circuit substrate and electrically connected to the positive tap; and a second terminal affixed to the lower surface of the circuit substrate and electrically connected to the negative tap. The gas sensor may be composed of a pair of gas sensors affixed to a surface of the case in which one of the pair of gas sensors may be immediately adjacent to the positive tap and another of the pair of gas sensors may be immediately adjacent to the negative tap.

Another aspect of the present invention battery provides for the protection circuit module further includes a first circuit unit electrically connected to the gas sensor to determine that a leakage of the electrolyte has occurred and to stop a charge/discharge operation of the battery and to forcibly discharge the battery; and a second circuit unit that monitors the charge/discharge state of the battery and controls the charge/discharge operation of the battery.

Another aspect of the present invention battery provides for the first circuit unit to further include a signal amplification unit that receives and amplifies the signal from gas sensor indicating the occurrence of the electrolyte leaking; an electrolyte leakage determination unit electrically connected to the signal amplification unit having a comparator that compares an output voltage of the signal of the gas sensor to a reference voltage and generates an output signal according to a result of the comparison; and a forcible discharge unit electrically connected to the electrolyte leakage determination unit having a first switch that is turned on or off according to the output signal of the comparator and a load resistor that forms a closed circuit together with the battery according to the on/off operation of the first switch. Upon the output signal of the comparator of the electrolyte leakage determination unit changes from a first level representing a normal state to a second level representing a leakage of the electrolyte, the battery may be forcibly discharged.

Another aspect of the present invention battery provides for the second circuit unit to further include a pair of external connection terminals that contact the battery to an external device; a switching device unit formed on a current path between the pair of external connection terminals and the battery; and a protection integrated circuit that controls the switching device unit.

Another aspect of the present invention battery provides for the protection integrated circuit to calculate an open circuit voltage of the battery and outputs a control signal to the switching device to turn off the switching device before the battery is overcharged or turn off the switching device before the battery is over discharged.

Another aspect of the present invention battery provides for the can to be a case that may be flexible and includes an upper case and a lower case which are sealed to contain the electrode assembly and electrolyte, a positive tap and a negative tap protrude from the case and may be connected to the electrode assembly.

Another aspect of the present invention battery provides for an air tight cover having an upper cover and a lower cover to completely encapsulate the case, positive and negative taps and the protection circuit module.

Another aspect of the present invention battery provides for the protection circuit module to further include a circuit substrate; a protection device coupled to a lower surface of the circuit substrate; a first terminal affixed to the lower surface of the circuit substrate and electrically connected to the positive tap; and a second terminal affixed to the lower surface of the circuit substrate and electrically connected to the negative tap. The gas sensor may be composed of a pair of gas sensor affixed to the lower surface of the circuit substrate in which one of the pair of gas sensors may be immediately adjacent to the first terminal and another of the pair of gas sensors may be immediately adjacent to the second terminal.

Another aspect of the present invention battery provides for the protection circuit module to further include a circuit substrate; a protection device coupled to a lower surface of the circuit substrate; a first terminal affixed to the lower surface of the circuit substrate and electrically connected to the positive tap; and a second terminal affixed to the lower surface of the circuit substrate and electrically connected to the negative tap. The gas sensor may be composed of a pair of gas sensors affixed to a surface of the case in which one of the pair of gas sensors may be immediately adjacent to the positive tap and another of the pair of gas sensors may be immediately adjacent to the negative tap.

Another aspect of the present invention battery provides for the protection circuit module to further include a first circuit unit electrically connected to the gas sensor to determine that a leakage of the electrolyte has occurred and to stop a charge/discharge operation of the battery cell and to forcibly discharge the battery cell; and a second circuit unit that monitors the charge/discharge state of the battery cell and controls the charge/discharge operation of the battery cell.

Another aspect of the present invention battery provides for the first circuit unit to further include a signal amplification unit that receives and amplifies the signal from gas sensor indicating the occurrence of the electrolyte leaking; an electrolyte leakage determination unit electrically connected to the signal amplification unit having a comparator that compares an output voltage of the signal of the gas sensor to a reference voltage and generates an output signal according to a result of the comparison; and a forcible discharge unit electrically connected to the electrolyte leakage determination unit having a first switch that is turned on or off according to the output signal of the comparator and a load resistor that forms a closed circuit together with the battery cell according to the on/off operation of the first switch. Upon the output signal of the comparator of the electrolyte leakage determination unit changes from a first level representing a normal state to a second level representing a leakage of the electrolyte, the battery cell may be forcibly discharged.

Another aspect of the present invention battery provides for the second circuit unit to further include a pair of external connection terminals that contact the battery cell to an external device; a switching device unit formed on a current path between the pair of external connection terminals and the battery cell; and a protection integrated circuit that controls the switching device unit.

Another aspect of the present invention battery provides for the protection integrated circuit to calculate an open circuit voltage of the battery cell and outputs a control signal to the switching device to turn off the switching device before the battery cell is overcharged turn off the switching device before the battery cell is over discharged.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
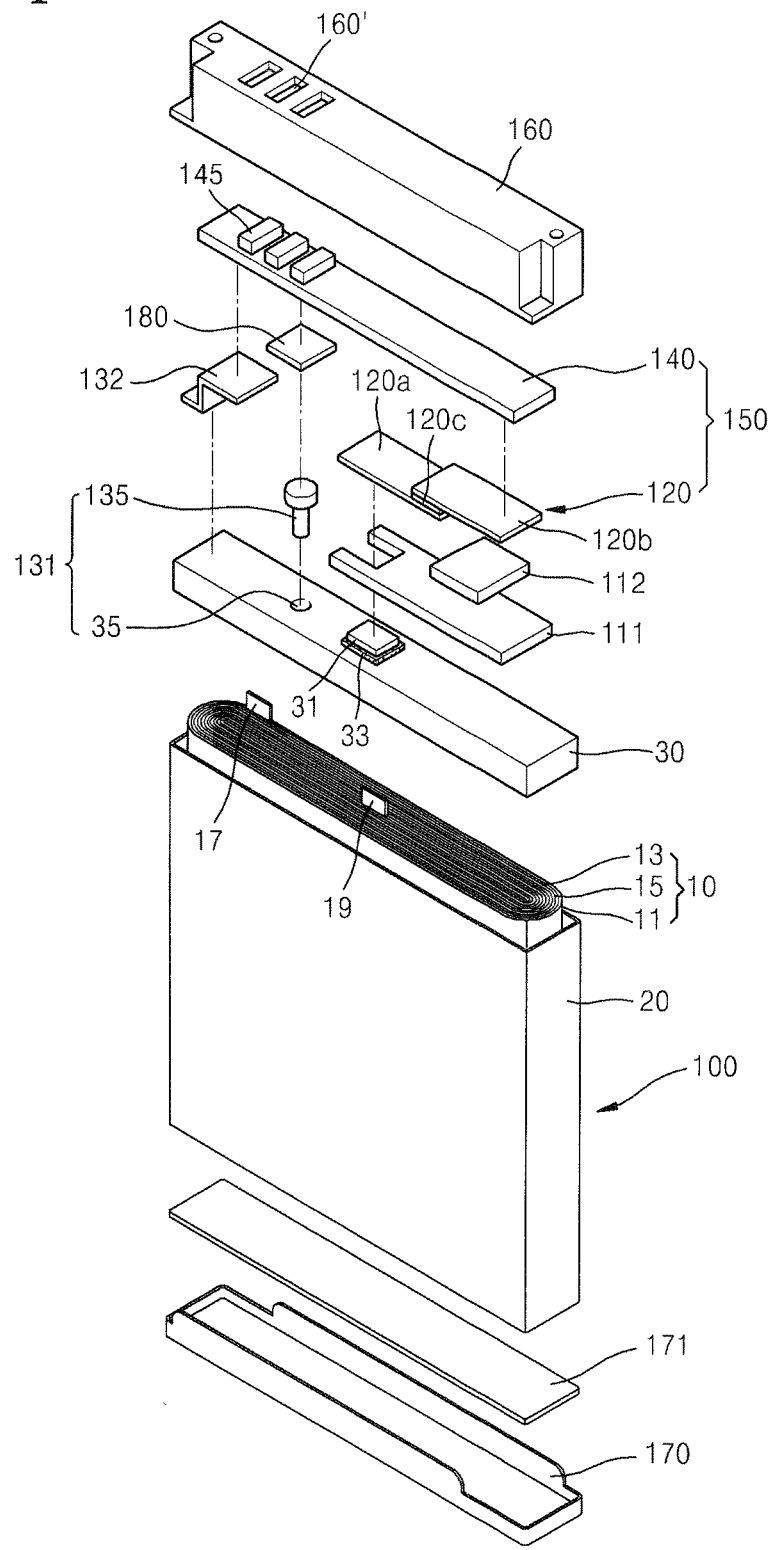
FIGS. 1 and 2 are exploded perspective views of a battery pack according to an embodiment of the present invention.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

In a secondary battery containing an electrolyte, although sealing is performed to prevent a leakage of the electrolyte, if overcharge is repeated, battery temperature is increased, an effort occurs in sealing of a case, etc., the electrolyte may leak out of the secondary battery.

According to the leakage of the electrolyte, a short or a malfunction of an electric circuit may occur, or a large amount of a current may flow along the leaked electrolyte to cause an accident such as heating, smoking, or firing.

According to one or more embodiments of the present invention, a battery pack capable of promptly and accurately sensing a leakage of an electrolyte by installing a gas sensor for detecting the leakage of the electrolyte, and thus performing a protection operation according to the leakage of the electrolyte is provided. Thus, in a secondary battery containing an electrolyte, a leakage of the electrolyte may be promptly detected by disposing a gas sensor at a location vulnerable to the leakage of the electrolyte, e.g., on an electrolyte injection unit or where electrode taps protrude.

Also, after a leakage of an electrolyte is sensed, an appropriate protection operation for stopping a charge/discharge operation of a battery cell and forcibly discharging the battery cell to exhaust charges may be performed.

Hereinafter, embodiments will be described in detail with reference to the accompanying drawings.

Figure 2:
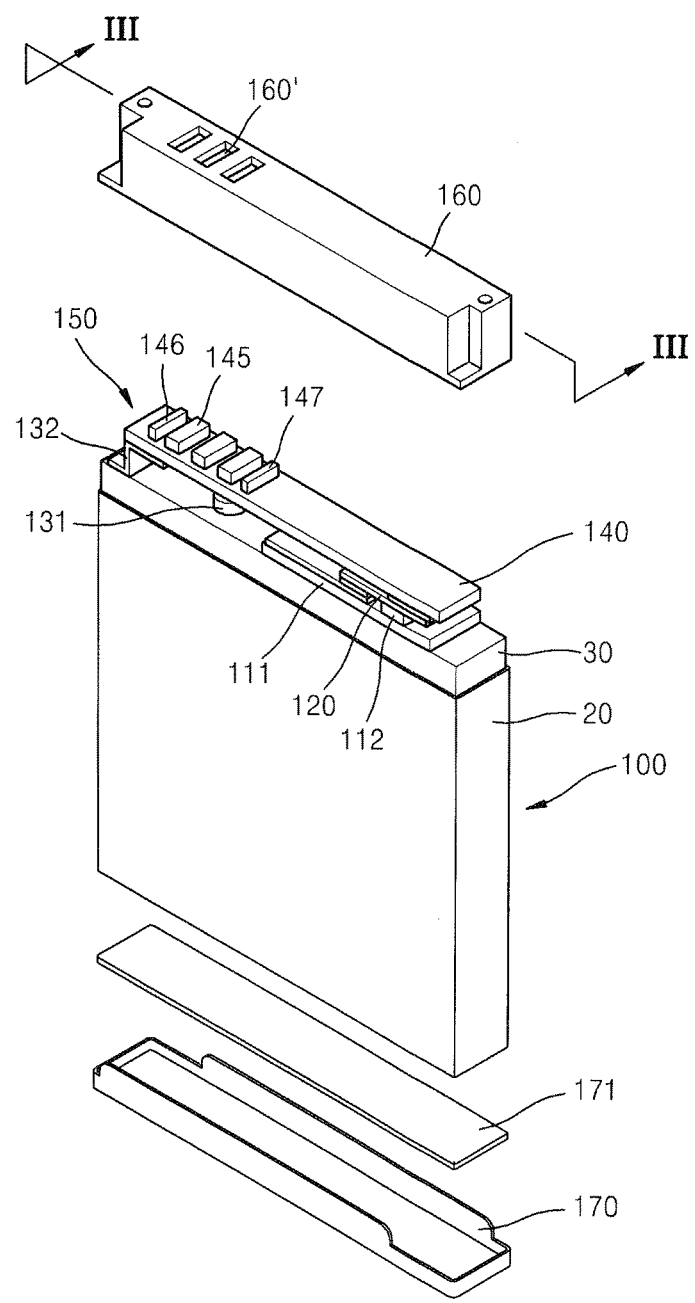
Figure 3:
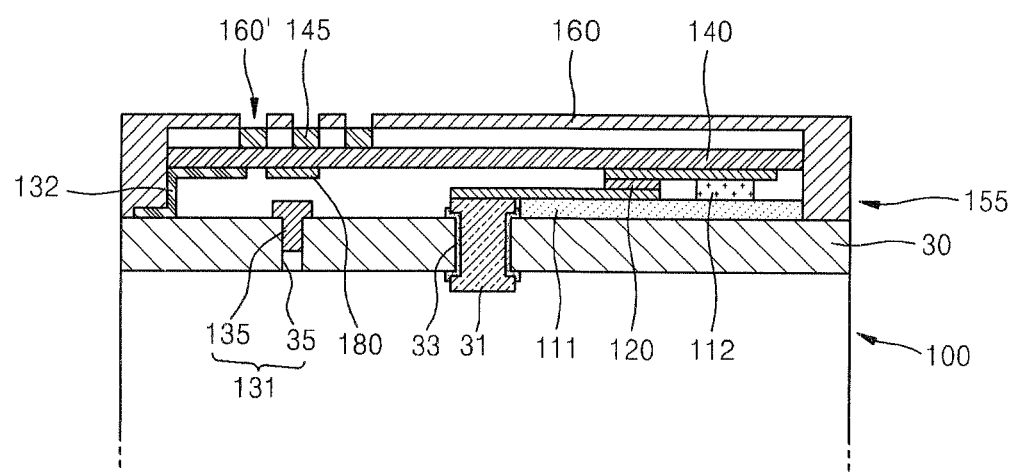
FIG. 3 is a cross-sectional view cut along a line illustrated in FIG. 2.

FIGS. 1 and 2 are exploded perspective views of a battery pack according to an embodiment of the present invention. FIG. 3 is a cross-sectional view cut along a line illustrated in FIG. 2.

Referring to FIGS. 1 through 3, the battery pack may include a battery cell 100 that is chargeable/dischargeable, a protection circuit module 150 mounted on the battery cell 100 to control a charge/discharge operation, and an upper cover 160 combined with the battery cell 100 to accommodate the protection circuit module 150.

The battery cell 100 is a rechargeable secondary battery, may be a lithium-ion battery, and may be formed by sealing in a can 20 an electrolyte (not shown) and an electrode assembly 10 including positive and negative plates 11 and 13, and a separator 15. For example, the battery cell 100 includes the electrode assembly 10 in which a stack of the positive and negative plates 11 and 13, and the separator 15 is wound in a jelly-roll type, the can 20 of which an upper portion is open to accommodate the electrode assembly 10 and the electrolyte, and a cap plate 30 for sealing the upper portion of the can 20. Contact portions between the cap plate 30 and the can 20 may be laser-welded to form an airtight structure.

Positive and negative taps 17 and 19 may be respectively connected to the positive and negative plates 11 and 13. For example, the positive tap 17 may be connected to the cap plate 30 and the negative tap 19 may be connected to an electrode terminal 31 protruding above the cap plate 30. The electrode terminal 31 may be insulatively connected to the cap plate 30, and may protrude above the cap plate 30. For example, an insulating gasket 33 may be interposed between the electrode terminal 31 and the cap plate 30.

The protection circuit module 150 controls the charge/discharge operation of the battery cell 100, and may block a flowing current to protect the battery cell 100 if overcharge/overdischarge occurs, if an over current greater than a threshold value flows, or if the battery cell 100 is heated to a temperature greater than a setup value. Also, the protection circuit module 150 may sense a leakage of the electrolyte to perform an appropriate protection operation. For example, the protection circuit module 150 may stop the charge/discharge operation of the battery cell 100 and may forcibly discharge the battery cell 100 to exhaust charges.

The protection circuit module 150 may include a circuit substrate 140 including a charge/discharge protection circuit and a sensing circuit for detecting state information such as a current or a voltage, and a protection device 120 connected to the circuit substrate 140 to restrict a charge/discharge current according to an increase in temperature.

The protection device 120 may be formed on a charge/discharge path of the battery cell 100. In more detail, the protection device 120 forms a charge/discharge current path between the circuit substrate 140 and the electrode terminal 31 on the cap plate 30. The protection device 120 increases an electric resistance if the temperature of the battery cell 100 exceeds a set threshold value so as to forcibly reduce a charge/discharge current. The protection device 120 may include a positive temperature coefficient (PTC) device or a temperature fuse.

The protection device 120 formed of a PTC device may include a variable resistor 120c of which an electric resistance value varies according to temperature, and first and second connection members 120a and 120b connected to the variable resistor 120c and extending in opposite directions. For example, the first connection member 120a may be connected to the electrode terminal 31 on the cap plate 30 while the second connection member 120b may be connected to the circuit substrate 140.

The positive and negative taps 17 and 19 of the battery cell 100 may be connected to the circuit substrate 140. For example, the negative tap 19 of the battery cell 100 may be connected to the circuit substrate 140 via the electrode terminal 31 and the protection device 120, and the positive tap 17 of the battery cell 100 may be connected to the circuit substrate 140 via the cap plate 30 and a lead member 132. The lead member 132 may be in the form of stairs to include a lower portion connected onto the cap plate 30, and an upper portion extending to contact the circuit substrate 140. For example, the lead member 132 may be welded onto the cap plate 30 or may be coupled onto the cap plate 30 by using a coupling member (not shown) that penetrates the cap plate 30.

Insulating members such as an insulating tape 111 and an insulating spacer 112 may be interposed between the protection circuit module 150 and the battery cell 100. For example, the insulating tape 111 and the insulating spacer 112 may be interposed between the protection circuit module 150 and the cap plate 30. The insulating tape 111 and the insulating spacer 112 basically performs an insulating function for preventing an electric short between the protection circuit module 150 and the cap plate 30. Also, the insulating tape 111 and the insulating spacer 112 may also fix the protection circuit module 150 on the cap plate 30. The insulating spacer 112 may support a portion of the protection circuit module 150 at a certain height from the cap plate 30, and may support a height step formed between the first and second connection members 120a and 120b at two sides of the protection device 120.

The upper cover 160 may be assembled on the battery cell 100 on which the protection circuit module 150 may be mounted, so as to accommodate the protection circuit module 150. In the upper cover 160, terminal holes 160' may be formed in an opening pattern to expose and connect external connection terminals 145 of the circuit substrate 140 to an external device.

An insulating label sheet (not shown) may surround and be adhered onto an outer circumferential surface of the battery cell 100, and an adhesive means 171 such as double-sided tape may be disposed on a bottom surface of the battery cell 100 to combine a lower cover 170.

An electrolyte injection unit 131 may be formed on the cap plate 30. The electrolyte injection unit 131 may include a sealing member 135 for sealing an injection hole 35 that penetrates the cap plate 30. For example, the electrolyte may be injected into the can 20 through the injection hole 35 of the cap plate 30 and, after the electrolyte is completely injected, the injection hole 35 may be sealed by using the sealing member 135. The sealing member 135 may be, for example, a plug fitted into the injection hole 35 or a resin material filled in the injection hole 35. In more detail, the plug may be ball-shaped base metal formed of aluminum (Al) or Al-containing metal, and may be put on the injection hole 35 and then mechanically pressed into the injection hole 35. Also, the plug may be welded around the injection hole 35 of the cap plate 30.

A gas sensor 180 may be disposed adjacent to the electrolyte injection unit 131. The gas sensor 180 senses a leakage of the electrolyte to prevent an unexpected accident.

The gas sensor 180 determines whether the electrolyte leaks by sensing an increase in gas pressure due to a leakage of the electrolyte. However, the current embodiment is not limited thereto and the gas sensor 180 senses, for example, the gas sensor 180 may determine whether the electrolyte leaks, by sensing a variation in electrical characteristics such as a resistance or an electric capacity, due to direct contact of the electrolyte.

The gas sensor 180 may be disposed adjacent to the electrolyte injection unit 131. As the gas sensor 180 may be disposed adjacent to the electrolyte injection unit 131 through which the electrolyte may possibly leak, a leakage of the electrolyte may be promptly and accurately sensed. Since the electrolyte may leak due to poor sealing of the electrolyte injection unit 131, corrosion of the sealing member 135 due to a long-time contact with the electrolyte, etc., a leakage of the electrolyte may be promptly and accurately sensed by disposing the gas sensor 180 adjacent to the electrolyte injection unit 131.

For example, a signal output terminal (not shown) of the gas sensor 180 may be electrically connected to the protection circuit module 150, and the gas sensor 180 may output to the protection circuit module 150 raw data for determining whether the electrolyte leaks. The protection circuit module 150 determines whether the electrolyte leaks, based on an output signal of the gas sensor 180. If it is determined that the electrolyte leaks, the protection circuit module 150 performs a protection operation for stopping a charge/discharge operation of the battery cell 100 and forcibly discharging the battery cell 100.

When the gas sensor 180 may be disposed adjacent to the electrolyte injection unit 131, as illustrated in FIG. 3, the gas sensor 180 may be disposed on the circuit substrate 140 facing the electrolyte injection unit 131. As the gas sensor 180 may be mounted on the circuit substrate 140, the connection between the gas sensor 180 and the circuit substrate 140 may be simplified and shortened. For example, the output signal of the gas sensor 180 may be input to the protection circuit module 150 and may be transmitted to a corresponding region of the protection circuit module 150 via a wiring pattern (not shown) formed on the circuit substrate 140.

Figure 4:
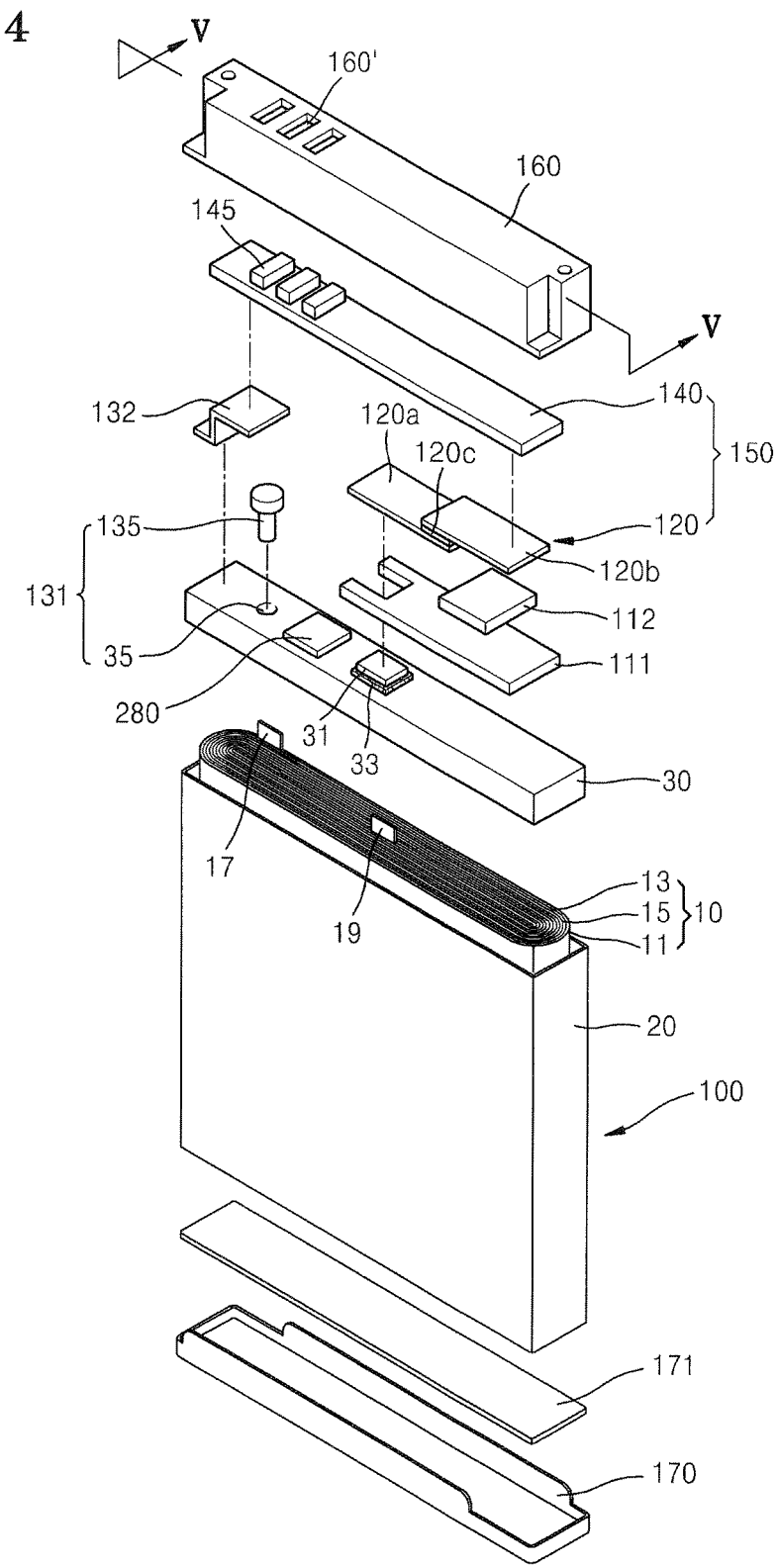
FIG. 4 is an exploded perspective view of a battery pack according to another embodiment of the present invention.
Figure 5:
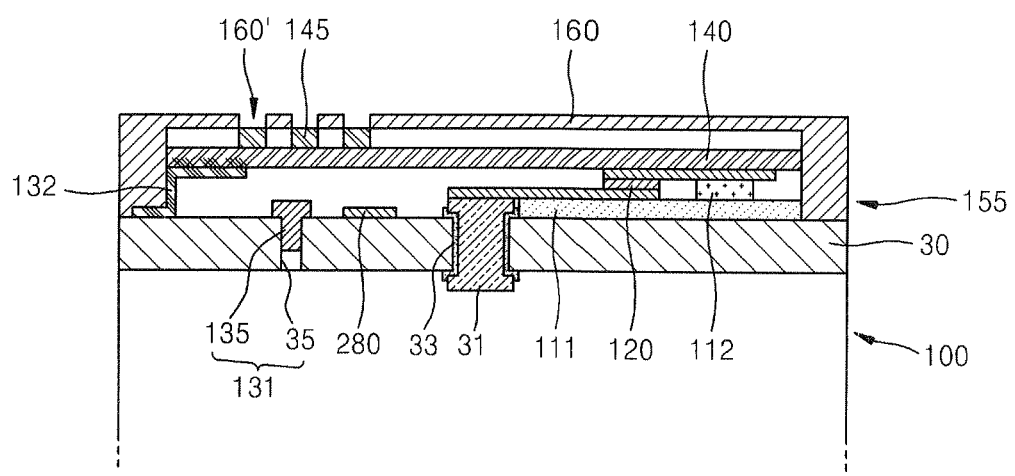
FIG. 5 is a cross-sectional view cut along a line V-V illustrated in FIG. 4.

FIG. 4 is an exploded perspective view of a battery pack according to another embodiment of the present invention. FIG. 5 is a cross-sectional view cut along a line V-V illustrated in FIG. 4. Referring to FIGS. 4 and 5, a gas sensor 280 is disposed adjacent to the electrolyte injection unit 131 formed on the cap plate 30. For example, the gas sensor 280 detects a leakage of the electrolyte by sensing an increase in gas pressure due to the leakage of the electrolyte. As the gas sensor 280 is disposed adjacent to the electrolyte injection unit 131 that is relatively vulnerable to a leakage of the electrolyte, the leakage of the electrolyte may be promptly and accurately detected from the electrolyte injection unit 131.

In the current embodiment, the gas sensor 280 may be mounted on the cap plate 30 adjacent to the electrolyte injection unit 131. Although not shown in FIGS. 4 and 5, for example, a signal output terminal (not shown) of the gas sensor 280 may be electrically connected to the protection circuit module 150, and the protection circuit module 150 may sense a leakage of the electrolyte based on an output signal of the gas sensor 280 and may perform a protection operation corresponding to the leakage of the electrolyte. For example, the protection circuit module 150 starts an operation for stopping a charge/discharge operation of the battery cell 100 and forcibly discharging the battery cell 100.

As the gas sensor 280 may be mounted on the cap plate 30, a design modification or redesigning of the circuit substrate 140 according to adding of the gas sensor 280 may be avoided or minimized, and a mounting space of the circuit substrate 140 on which various circuit devices directly related to the performance of the battery pack are mounted may be efficiently utilized.

Figure 6:
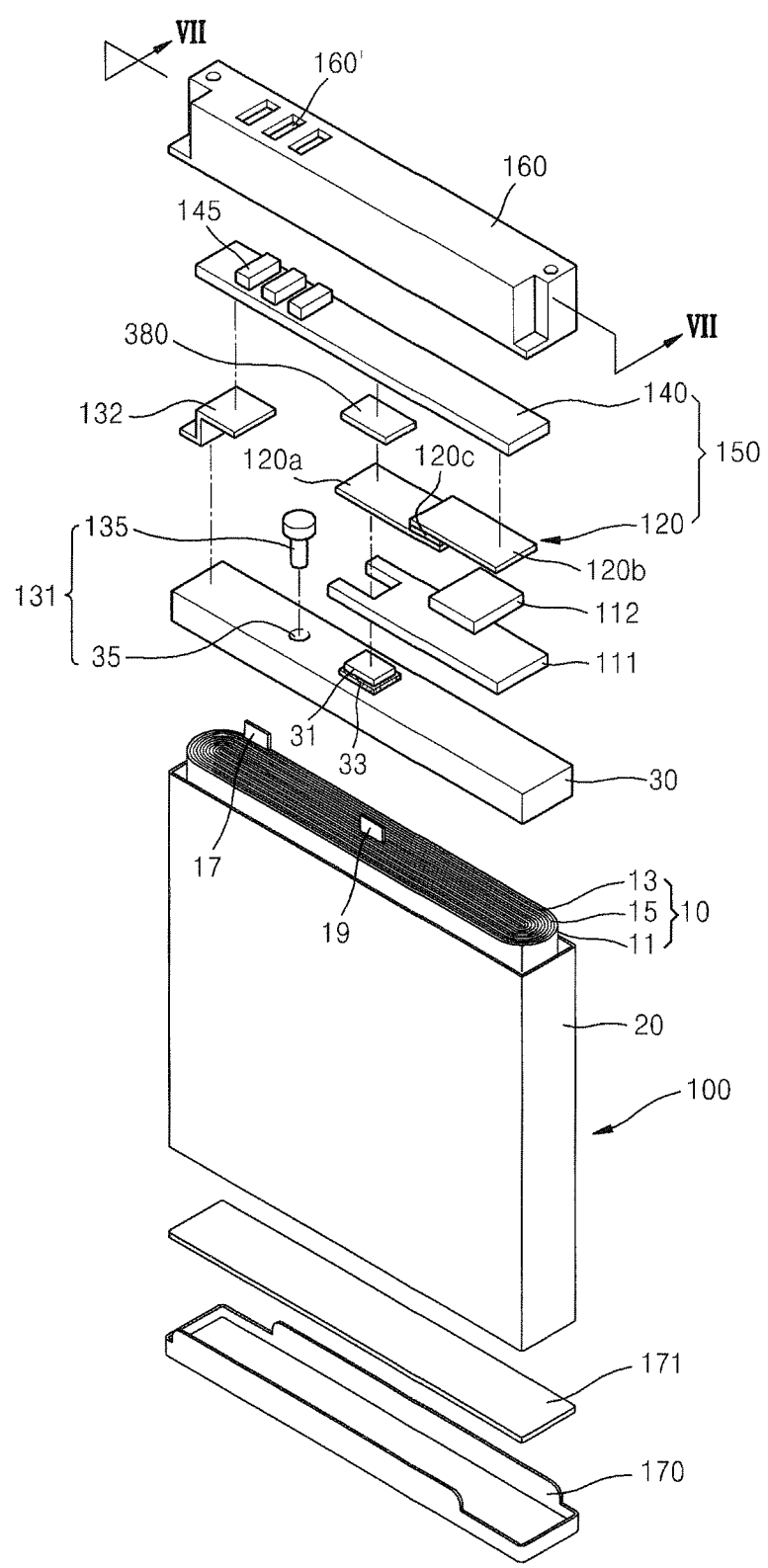
FIG. 6 is an exploded perspective view of a battery pack according to another embodiment of the present invention.
Figure 7:
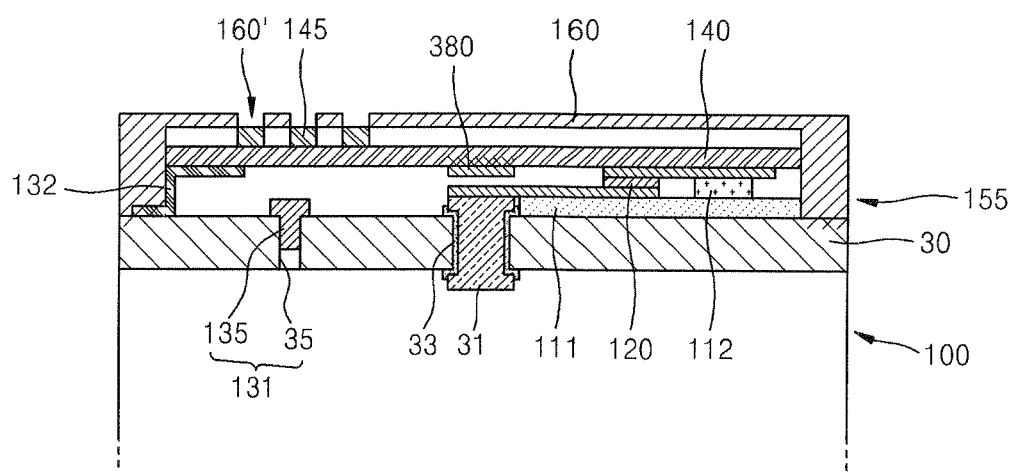
FIG. 7 is a cross-sectional view cut along a line VII-VII illustrated in FIG. 6.

FIG. 6 is an exploded perspective view of a battery pack according to another embodiment of the present invention. FIG. 7 is a cross-sectional view cut along a line VII-VII illustrated in FIG. 6. Referring to FIGS. 6 and 7, the battery pack includes the battery cell 100 including the electrode assembly 10 impregnated with an electrolyte (not shown), the protection circuit module 150 mounted on the battery cell 100, and the upper cover 160 assembled on the battery cell 100 to accommodate the protection circuit module 150.

The electrode terminal 31 electrically connected to an electrode tap, e.g., the negative tap 19, of the electrode assembly 10 is exposed on the cap plate 30 of the battery cell 100. The electrode terminal 31 may be insulatively assembled with the cap plate 30 by interposing the insulating gasket 33 therebetween, and may be externally exposed to be electrically connected to the protection circuit module 150. The insulating gasket 33 may prevent a leakage of the electrolyte through a gap between the electrode terminal 31 and the cap plate 30, and may be formed around the electrode terminal 31 to insulatively combine the electrode terminal 31 and the cap plate 30. Meanwhile, the electrolyte injection unit 131 for injecting the electrolyte may be formed on the cap plate 30, and may include the injection hole 35 that penetrates the cap plate 30, and the sealing member 135 for sealing the injection hole 35.

A gas sensor 380 for sensing a leakage of the electrolyte may be disposed adjacent to the electrode terminal 31. For example, the gas sensor 380 determines whether the electrolyte leaks, by sensing an increase in gas pressure. A signal output terminal (not shown) of the gas sensor 380 may be electrically connected to the protection circuit module 150, and may output to the protection circuit module 150 raw data for determining whether the electrolyte leaks. The protection circuit module 150 may determine whether the electrolyte leaks, based on an output signal of the gas sensor 380. For example, if it is determined that the electrolyte leaks, the protection circuit module 150 performs a protection operation for stopping a charge/discharge operation of the battery cell 100 and forcibly discharging the battery cell 100.

The electrode terminal 31 is connected to the protection circuit module 150. For example, the electrode terminal 31 may be welded to the first connection member 120a protruding from the protection device 120. In this case, due to heat generated when the electrode terminal 31 is welded, the insulating gasket 33 closely contacting the electrode terminal 31 may be damaged and thus the electrolyte may leak adjacent to the electrode terminal 31. Therefore, as the gas sensor 380 may be disposed adjacent to the electrode terminal 31 through which the electrolyte may possibly leak, a leakage of the electrolyte may be promptly and accurately detected. A leakage of the electrolyte adjacent to the electrode terminal 31 may occur when the welding of the electrode terminal 31 becomes poor, sealing characteristics of the insulating gasket 33 around the electrode terminal 31 are reduced, a chemical resistance of the insulating gasket 33 is reduced due to a long-time contact with the electrolyte, etc., and may be promptly and accurately sensed by disposing the gas sensor 380 adjacent to the electrode terminal 31.

The gas sensor 380 may be mounted adjacent to the electrode terminal 31, and more particularly, on the protection circuit module 150 facing the electrode terminal 31. For example, as illustrated in FIGS. 6 and 7, the gas sensor 380 may be mounted on a surface the circuit substrate 140 facing the electrode terminal 31. As the gas sensor 380 may be directly mounted on the circuit substrate 140, an additional connection structure for connecting the signal output terminal of the gas sensor 380 to the circuit substrate 140 may not be formed, and an output signal of the gas sensor 380 may be directly transmitted to a corresponding region of the protection circuit module 150 via a wiring pattern (not shown) formed on the circuit substrate 140.

Although the gas sensor 380 may be mounted on the circuit substrate 140 facing the electrode terminal 31 as illustrated in FIGS. 6 and 7, the current embodiment is not limited thereto and the gas sensor 380 may be disposed, for example, on the cap plate 30 adjacent to the electrode terminal 31. As the gas sensor 380 may be mounted on the cap plate 30, a design modification or redesigning of the protection circuit module 150, e.g., the circuit substrate 140, according to adding of the gas sensor 380 may be avoided or minimized. Meanwhile, the signal output terminal of the gas sensor 380 may be electrically connected to the protection circuit module 150 via an appropriate wiring (not shown).

Figure 8:
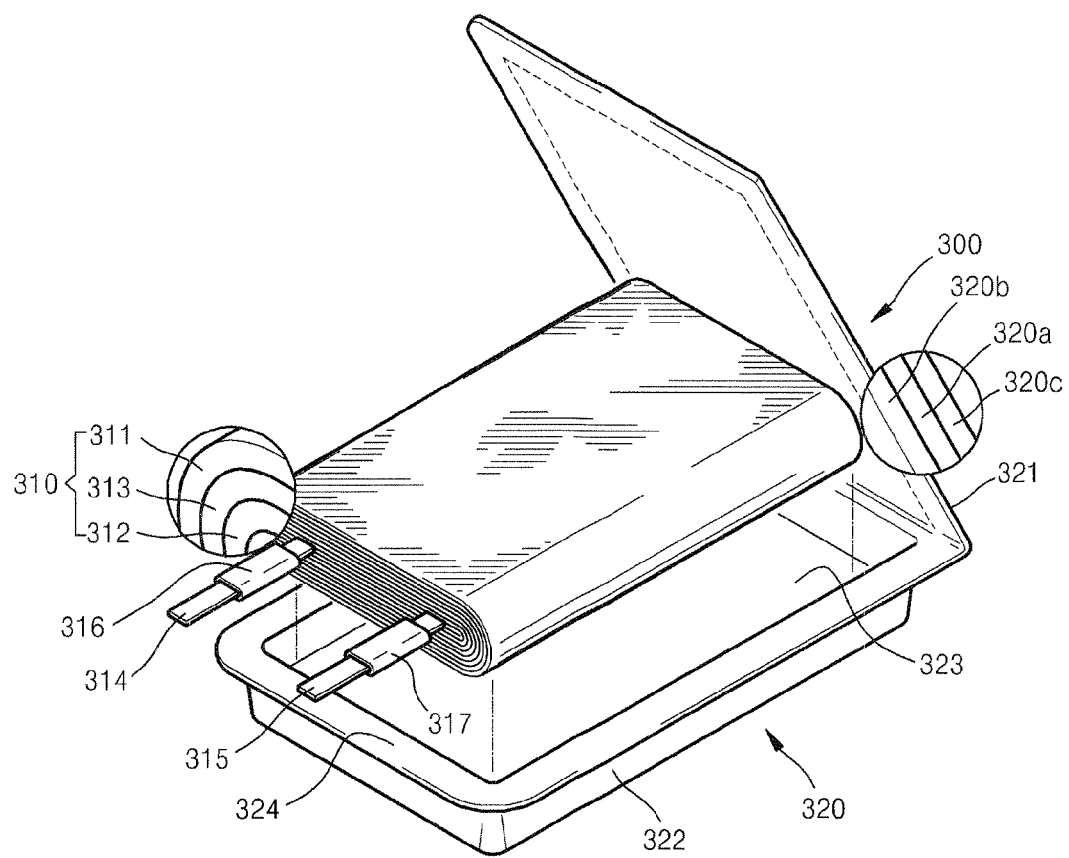
FIG. 8 is an exploded perspective view of a battery cell according to another embodiment of the present invention.
Figure 9:
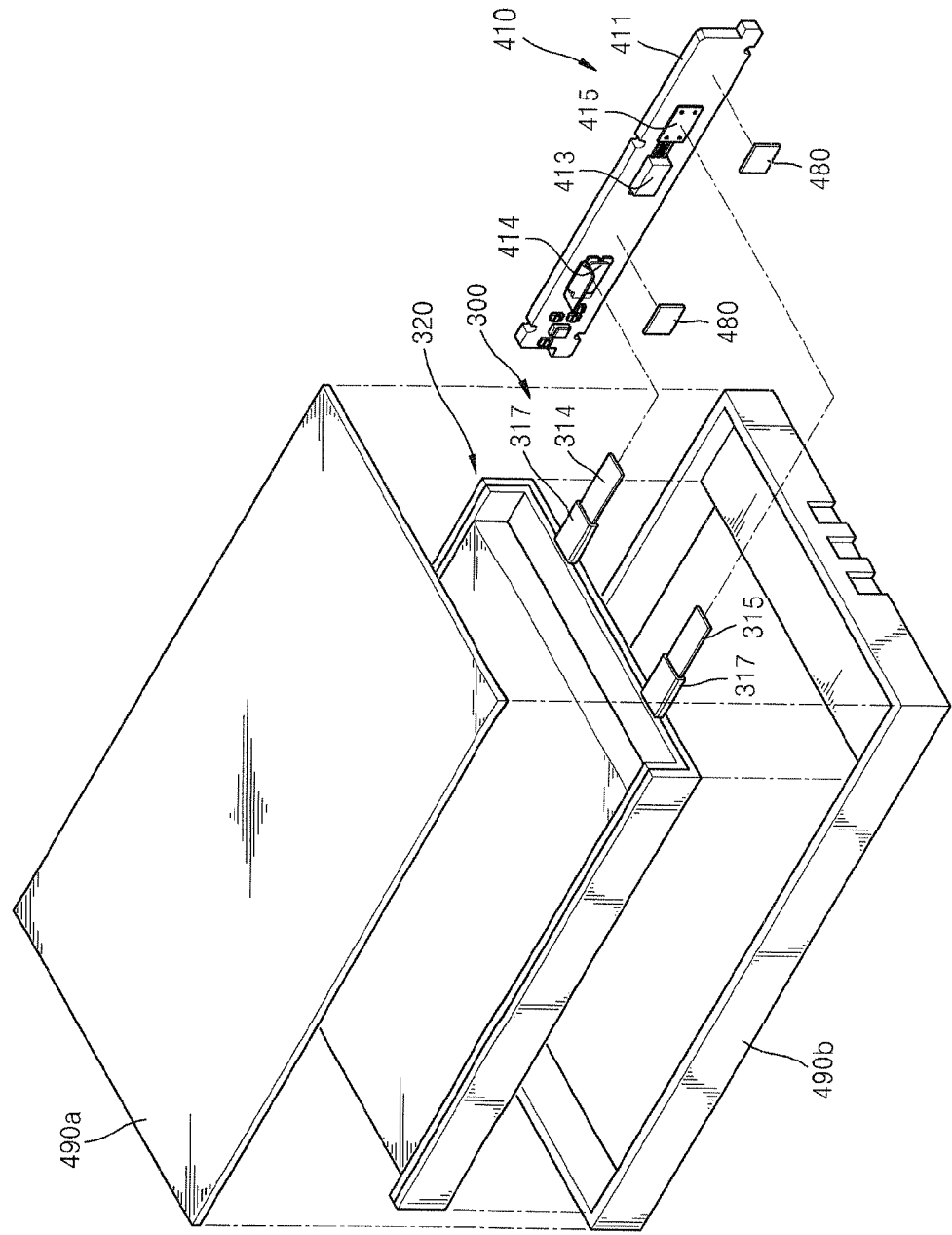
FIG. 9 is an exploded perspective view of a battery pack including the battery cell illustrated in FIG. 8.

FIG. 8 is an exploded perspective view of a battery cell 300 according to another embodiment of the present invention. FIG. 9 is an exploded perspective view of a battery pack including the battery cell 300 illustrated in FIG. 8. Referring to FIGS. 8 and 9, the battery pack includes the battery cell 300, and a protection circuit module 410 electrically connected to the battery cell 300.

Referring to FIG. 8, the battery cell 300 includes an electrode assembly 310, and a case 320 for accommodating the electrode assembly 310. The electrode assembly 310 includes positive and negative plates 311 and 312, and a separator 313 interposed between the positive and negative plates 311 and 312. Electrode taps for forming a charge/discharge current path are formed on the electrode assembly 310. The electrode taps may include positive and negative taps 314 and 315 that may be electrically connected to the positive and negative plates 311 and 312.

Insulating tapes 316 and 317 may be respectively wrapped around the positive and negative taps 314 and 315. The insulating tapes 316 and 317 may be formed to contact a sealing surface 324 of the case 320 so as to insulate the positive and negative taps 314 and 315 from the case 320, and may be thermally melted together with the sealing surface 324 of the case 320 to increase sealing characteristics of the case 320.

The case 320 includes an upper case 321 and a lower case 322 and, for example, at least one-side surfaces of the upper and lower cases 321 and 322 may be integrally combined. A portion where the upper and lower cases 321 and 322 are integrally combined may form a folding part, and the upper and lower cases 321 and 322 may be folded in facing directions by using the folding part such that a space 323 for accommodating the electrode assembly 310 is sealed. The case 320 may be a flexible pouch-type case including a metal foil 320a, and insulating films 320b and 320c stacked on two surfaces of the metal foil 320a.

The electrode assembly 310 may be located in the space 323 provided by the case 320. The upper and lower cases 321 and 322 for accommodating the electrode assembly 310 may be folded with respect to the folding part in facing directions. Facing sealing parts of the upper and lower cases 321 and 322 may be thermally melted and thus bonded to each other, and the insulating tapes 316 and 317 wrapped around the positive and negative taps 314 and 315 may be thermally melted together with the case 320 between the sealing parts of the upper and lower cases 321 and 322. Ends of the positive and negative taps 314 and 315 may protrude from the sealed case 320.

As illustrated in FIG. 9, the positive and negative taps 314 and 315 protruding from the case 320 may be electrically connected to first and second terminals 414 and 415 formed on a circuit substrate 411. For example, the positive tap 314 may be electrically connected to the first terminal 414 of the circuit substrate 411, and the negative tap 315 may be electrically connected to the second terminal 415 of the circuit substrate 411.

The protection circuit module 410 electrically connected to the battery cell 300 may include a circuit substrate 411 including a charge/discharge protection circuit and a sensing circuit for detecting state information such as a current or a voltage, and a protection device 413 connected to the circuit substrate 411 to restrict a charge/discharge current according to an increase in temperature.

The protection device 413 may be formed on a charge/discharge path of the battery cell 300. In more detail, the protection device 413 may be formed on a current path induced by the positive and negative taps 314 and 315, and may be connected to the second terminal 415 connected to the negative tap 315 via, for example, a circuit wiring.

The protection device 413 increases an electric resistance if the temperature of the battery cell 300 exceeds a set threshold value so as to forcibly reduce a charge/discharge current. The protection device 413 may include a PTC device or a temperature fuse.

Gas sensors 480 may be disposed adjacent to the positive and negative taps 314 and 315 of the battery cell 300. The gas sensors 480 convert a variation in gas pressure into an electrical signal and output the electrical signal, and the output signal of the gas sensors 480 may be input to the protection circuit module 410 connected to an output terminal (not shown) of the gas sensors 480. The gas sensors 480 detect whether an electrolyte (not shown) leaks, by measuring a variation in gas pressure. However, the current embodiment is not limited thereto and, for example, the gas sensors 480 may determine whether the electrolyte leaks, by sensing a variation in electrical characteristics such as a resistance or an electric capacity, due to direct contact of the electrolyte.

The positive and negative taps 314 and 315 of the battery cell 300 may protrude externally between the combined sealing parts of the upper and lower cases 321 and 322, and the electrolyte filled in the battery cell 300 may leak externally through a gap between the positive and negative taps 314 and 315 and the upper and lower cases 321 and 322. In this case, the gas sensors 480 may be disposed adjacent to the positive and negative taps 314 and 315 to promptly and accurately sense a leakage of the electrolyte.

For example, a leakage of the electrolyte may occur due to deterioration of step coverage characteristics regarding whether the combined upper and lower cases 321 and 322 may completely seal stepped portions where the positive and negative taps 314 and 315 protrude externally, or deterioration in sealing characteristics between the upper and lower cases 321 and 322 and the positive and negative taps 314 and 315 due to a long-time operation. In the current embodiment, a leakage of the electrolyte may be promptly and accurately sensed by disposing the gas sensors 480 adjacent to the positive and negative taps 314 and 315.

The gas sensors 480 may be formed adjacent to the positive and negative taps 314 and 315, and more particularly, on the circuit substrate 411 facing the positive and negative taps 314 and 315. As the gas sensors 480 may be directly mounted on the circuit substrate 411, an additional signal wiring for transmitting an output signal of the gas sensors 480 is not required, and the output signal of the gas sensors 480 may be directly transmitted to a corresponding region of the protection circuit module 410 via a wiring pattern (not shown) on the circuit substrate 411.

The gas sensors 480 may be formed in a pair to correspond to the positive and negative taps 314 and 315 protruding from the case 320. However, the current embodiment is not limited thereto and, for example, one gas sensor 480 may be formed to correspond one of the positive and negative taps 314 and 315 or at a location between the positive and negative taps 314 and 315, so as to sense a leakage of the electrolyte.

As illustrated in FIG. 9, a cover may include upper cover 490a and lower cover 490b, and the upper and lower covers (490a and 490b) would be assembled to each other along the facing direction with the batter cell 300 with protection circuit module 410 therebetween, and such configuration may provide a sealed space accommodating the gas sensor.

Figure 10:
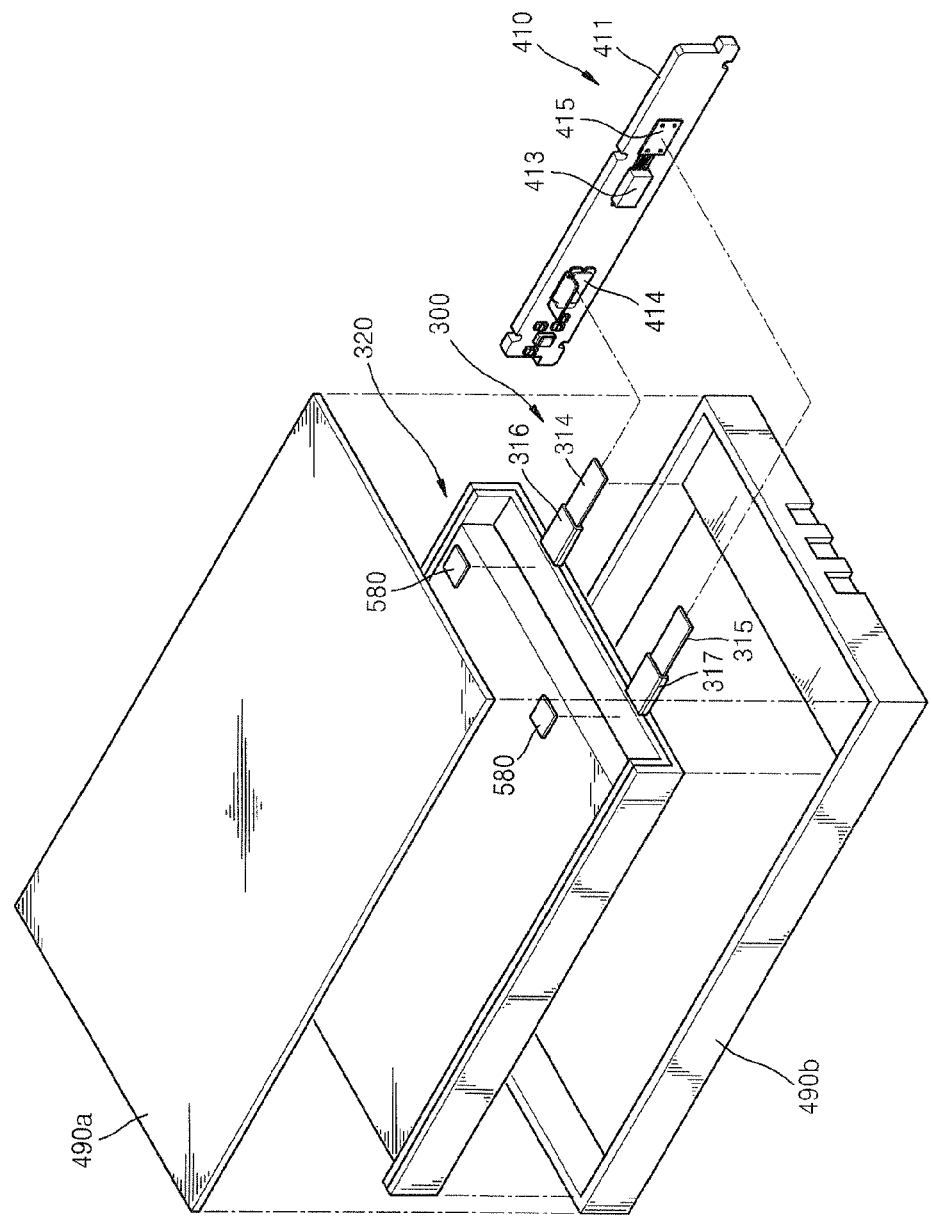
FIG. 10 is an exploded perspective view of a battery pack according to another embodiment of the present invention.

FIG. 10 is an exploded perspective view of a battery pack according to another embodiment of the present invention. Referring to FIG. 10, gas sensors 580 for sensing a leakage of the electrolyte may be disposed adjacent to the positive and negative taps 314 and 315 protruding from the case 320. The gas sensors 580 may be disposed at a side of the case 320, where the positive and negative taps 314 and 315 protrude. For example, as illustrated in FIG. 10, the gas sensors 580 may be disposed at a side of sealing parts of the case 320, which may be thermally melted together by interposing the positive and negative taps 314 and 315 therebetween. Although not shown in FIG. 10, output signal terminals (not shown) of the gas sensors 580 may be electrically connected to the protection circuit module 410, and appropriate signal wirings (not shown) for the electrical connection may be formed between the gas sensors 580 and the protection circuit module 410.

As the gas sensors 580 may be mounted at a side of the case 320 instead of on the protection circuit module 410, a design modification or redesigning of the protection circuit module 410, e.g., the circuit substrate 411, according to adding of the gas sensors 580 may be avoided or minimized, and a mounting space of the protection circuit module 410 on which a plurality of electric devices directly related to the performance of the battery pack may be mounted may be saved.

As illustrated in FIG. 10, a cover may include upper cover 490a and lower cover 490b, and the upper and lower covers (490a and 490b) would be assembled to each other along the facing direction with the batter cell 300 with protection circuit module 410 therebetween, and such configuration may provide a sealed space accommodating the gas sensor.

Figure 11:
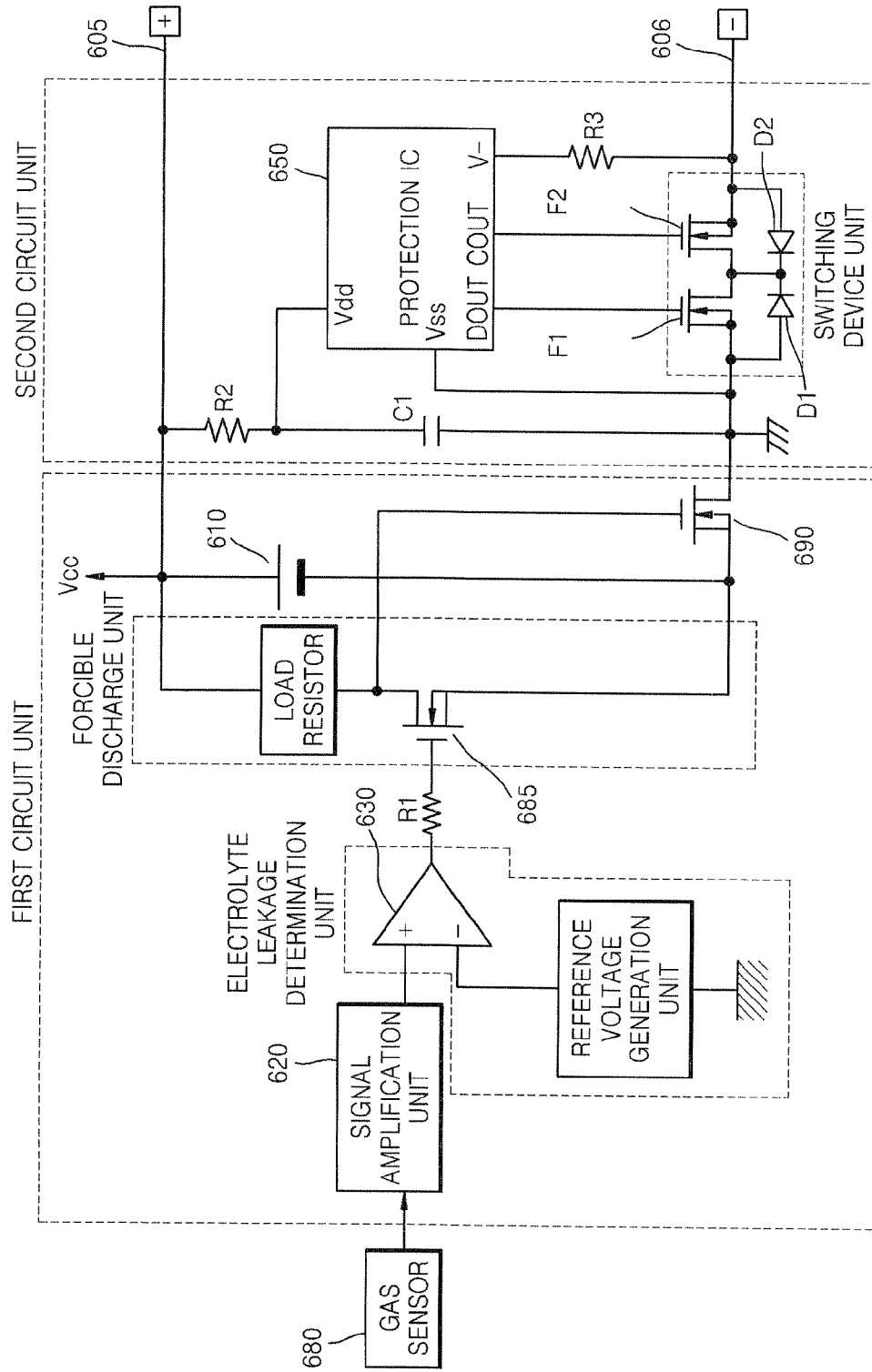
FIG. 11 is a circuit diagram of a protection circuit module applicable to a battery pack according to an embodiment of the present invention.

FIG. 11 is a circuit diagram of a protection circuit module applicable to a battery pack according to an embodiment of the present invention. The protection circuit module includes a first circuit unit for sensing a leakage of an electrolyte to stop a charge/discharge operation of a battery cell 610 and to forcibly start to discharge the battery cell 610, and a second circuit unit for forming a charge/discharge path with an external device (e.g., an external power supply device or an external load) and controlling the charge/discharge operation of the battery cell 610 according to a charge/discharge state. Although the first and second circuit units are separated in FIG. 11 for convenience of explanation, the first and second circuit units may be mixed with each other and thus may not be clearly separated in a functional or structural way.

The first circuit unit senses a leakage of the electrolyte and is involved in a protection operation according to the leakage of the electrolyte. The second circuit unit monitors the charge/discharge state of the battery cell 610 to control the charge/discharge operation. For example, the second circuit unit may sense overheating of the battery cell 610 to control the charge/discharge operation regardless of a leakage of the electrolyte.

The first circuit unit includes an electrolyte leakage determination unit for determining whether the electrolyte leaks, based on an output signal of a gas sensor 680, a forcible discharge unit for forcibly discharging the battery cell 610 if it is determined that the electrolyte leaks, and a charge/discharge switch 690 for stopping a normal charge/discharge operation performed in connection with an external device.

The gas sensor 680 converts information regarding a gas pressure sensed adjacent to, for example, an electrolyte injection unit, into an electrical signal. The output signal of the gas sensor 680 may be input to the electrolyte leakage determination unit via a signal amplification unit 620.

The electrolyte leakage determination unit determines whether the electrolyte leaks, by comparing an output voltage of the gas sensor 680 to a reference voltage. In more detail, the electrolyte leakage determination unit may include a comparator 630 for comparing the output voltage of the gas sensor 680 to the reference voltage, and generating an output signal according to the comparison result. The comparator 630 outputs a signal of a high level or a low level according to a sign of the difference between the output voltage and the reference voltage.

The output voltage of the gas sensor 680 may be input to a non-inverting terminal of the comparator 630, and the reference voltage may be input to an inverting terminal of the comparator 630. For example, if the output voltage of the gas sensor 680 is lower than the reference voltage, the comparator 630 may output a low-level signal representing that the gas pressure is normal. If the output voltage of the gas sensor 680 is higher than the reference voltage, the comparator 630 may output a high-level signal representing that the gas pressure is abnormal. Accordingly, immediately when the gas sensor 680 senses a leakage of the electrolyte, the output signal of the comparator 630 may be transited from a low level to a high level. Alternatively, the terminals to which the output signal of the gas sensor 680 and the reference voltage are input may be switched or, according to operation methods of the gas sensor 680 and the comparator 630, the output signal of the comparator 630 may be transited from a high level to a low level immediately when a leakage of the electrolyte is sensed.

A reference voltage generation unit generates and outputs a predetermined reference voltage to the comparator 630. Although not shown in FIG. 11, the reference voltage generation unit may be realized by using reference resistance elements for distributing a power voltage.

The output signal of the comparator 630 may be input to the forcible discharge unit. The forcible discharge unit includes a first switch 680 to be turned on/off according to the output signal of the comparator 630, and a load resistor for forming a closed circuit together with the battery cell 610 according to the on/off operation of the first switch 680.

The first switch 680 may be connected to an output terminal of the comparator 630 by interposing a resistor R1 therebetween. For example, if the output signal of the comparator 630 is in a high level, the first switch 680 is turned on. As such, a current flows through the load resistor connected to the first switch 680, the battery cell 610 and the load resistor form a closed circuit, and thus the battery cell 610 starts to be forcibly discharged. That is, if the output signal of the electrolyte leakage determination unit is transited from a first level representing a normal state to a second level representing a leakage of the electrolyte, the battery cell 610 starts to be forcibly discharged.

As described above, when a leakage of the electrolyte is sensed, the protection circuit module forcibly discharges the battery cell 610 and stops a normal charge/discharge operation performed in connection with an external device such as an external power supply device or an external load. In more detail, if forcible discharge starts, a voltage drop occurs due to the load resistor, the charge/discharge switch 690 (or the second switch) connected below the load resistor is turned off, and thus the charge/discharge path of the battery cell 610 connected to external connection terminals 605 and 606 is blocked.

The charge/discharge switch 690 is associated with the first switch 680 for opening/closing a current path for forcible discharge, and blocks the charge/discharge path of the battery cell 610 connected to the external connection terminals 605 and 606 immediately when forcible discharge starts. Consequently, if the output signal of the electrolyte leakage determination unit is transited from a first level representing a normal state to a second level representing a leakage of the electrolyte, the battery cell 610 starts to be forcibly discharged and the charge/discharge path of the battery cell 610 connected to the external connection terminals 605 and 606 is blocked. The first switch 680 and the charge/discharge switch 690 may be various switch devices such as field effect transistors (FETs) or semiconductor switches.

The second circuit unit forms the charge/discharge path with the external device and controls the charge/discharge operation of the battery cell 610. The second circuit unit includes the external connection terminals 605 and 606 that contact the external device, a switching device unit formed on a current path between the external connection terminals 605 and 606 and the battery cell 610, and a protection integrated circuit (IC) 650 for controlling the switching device unit.

The protection IC 650 operates by using a voltage between terminals Vdd and Vss as power, the terminal Vss may be connected to a negative terminal of the battery cell 610, and the terminal Vdd may be connected to a positive terminal Vcc of the battery cell 610 by using a pull-up resistor R2. A capacitor C1 for removing a noise signal may be connected between the terminals Vdd and Vss. Also, a resistor R3 may be connected between a terminal V− of the protection IC 650 and the negative terminal of the battery cell 610. The protection IC 650 includes terminals DOUT and COUT for controlling the switching device unit. The terminal COUT may be connected to a gate terminal of a charge FET F2, and the terminal DOUT may be connected to a gate terminal of a discharge FET F1.

The switching device unit includes a charge switching device (F2, D2) and a discharge switching device (F1, D1). The charge switching device (F2, D2) includes the charge FET F2 and a parasitic diode D2 for the charge FET F2. The charge FET F2 has a drain and a source disposed on the charge/discharge path of the battery cell 610. Also, the charge FET F2 has a gate to be turned on or off by a control signal input from the protection IC 650. If an external power supply device (not shown) may be connected to the external connection terminals 605 and 606, the charge FET F2 is turned on to apply a charge current to the battery cell 610. The parasitic diode D2 may be electrically connected the charge FET F2 in parallel.

The discharge switching device (F1, D1) includes the discharge FET F1 and a parasitic diode D1 for the discharge FET F1. The discharge FET F1 has a drain and a source disposed on the charge/discharge path of the battery cell 610. Also, the discharge FET F1 has a gate electrically connected to the protection IC 650 and to be turned on or off by the control signal input from the protection IC 650. The discharge FET F1 is turned on to supply a discharge current of the battery cell 610 to an external load (not shown) connected to the external connection terminals 605 and 606. The parasitic diode D1 may be electrically connected the discharge FET F1 in parallel.

For example, the protection IC 650 calculates an open circuit voltage (OCV) of the battery cell 610, and thus outputs the control signal to the charge switching device (F2, D2) and the discharge switching device (F1, D1). For example, the protection IC 650 may turn off the charge switching device (F2, D2) before the battery cell 610 is overcharged, such that a charge current does not flow from the external power supply device, and may turn off the discharge switching device (F1, D1) before the battery cell 610 is overdischarged, such that a discharge current does not flow to the external load.

Therefore, the battery pack is capable of promptly and accurately sensing a leakage of an electrolyte by installing a gas sensor for detecting the leakage of the electrolyte, and thus performing a protection operation according to the leakage of the electrolyte is provided. Thus, a leakage of the electrolyte may be promptly detected by disposing a gas sensor at a location vulnerable to the leakage of the electrolyte, e.g., on an electrolyte injection unit or where electrode taps protrude.

Also, in the battery pack after a leakage of an electrolyte is sensed, an appropriate protection operation for stopping a charge/discharge operation of a battery cell and forcibly discharging the battery cell to exhaust charges may be performed.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery having a can containing an electrode assembly and an electrolyte and a cap assembly with a cap plate having an electrolyte injection unit, said electrolyte injection unit having an injection hole via which said electrolyte is injected into the electrode assembly and a sealing member to seal said injection hole, the cap plate is coupled to the can and an upper cover is coupled to the cap plate, comprising:
    a gas sensor located within the cap assembly and positioned immediately adjacent to said sealing member of said electrolyte injection unit to detect leakage of the electrolyte into the cap assembly; and
    a protective circuit module mounted to the cap plate and electrically coupled to the gas sensor, the protective circuit module is adapted to stop a charge/discharge operation of the battery and discharge the battery upon receipt of a signal from the gas sensor indicating detection of leakage of the electrolyte into the cap assembly.

2. The battery recited in claim 1, wherein the gas sensor is a pressure sensor that detects a leakage of the electrolyte into the cap assembly by detecting an increase in vapor pressure in the cap assembly caused by the leakage of the electrolyte into the cap assembly.

3. The battery recited in claim 1, wherein the gas sensor detects a leakage of the electrolyte into the cap assembly by a change in resistance or electric capacity of the gas sensor caused by contact of the electrolyte with the gas sensor.

4. The battery recited in claim 1, wherein the protection circuit module further comprises:
    a circuit substrate having a plurality of external connection terminals on an upper surface of the circuit substrate that are exposed from a plurality of terminal holes in the upper cover; and
    a protection device coupled to a lower surface of the circuit substrate,
    wherein the gas sensor is affixed to the lower surface of the circuit substrate immediately above the electrolyte injection unit of the cap plate.

5. The battery recited in claim 1, wherein the gas sensor is coupled to a surface of the cap plate immediately adjacent to the electrolyte injection unit.

6. The battery recited in claim 1, wherein the protection circuit module further comprises:
    a circuit substrate having a plurality of external connection terminals on an upper surface of the circuit substrate that protrude through a plurality of terminal holes in the upper cover; and
    a protection device coupled to a lower surface of the circuit substrate,
    wherein the gas sensor is affixed to the lower surface of the circuit substrate immediately above an electrode terminal that protrudes through the cap plate, said electrode terminal is connected to a negative tap that is connected to the electrode assembly.

7. The battery recited in claim 1, wherein the can is a case that is flexible and includes an upper case and a lower case which are sealed to contain the electrode assembly and electrolyte, a positive tap and a negative tap that are connected to the electrode assembly protrude from the case.

8. The battery recited in claim 7, wherein the protection circuit module further comprises:
    a circuit substrate;
    a protection device coupled to a lower surface of the circuit substrate;
    a first terminal affixed to the lower surface of the circuit substrate and electrically connected to the positive tap; and
    a second terminal affixed to the lower surface of the circuit substrate and electrically connected to the negative tap,
    wherein the gas sensor is composed of a pair of gas sensors affixed to the lower surface of the circuit substrate in which one of the pair of gas sensors is immediately adjacent to the first terminal and another of the pair of gas sensors is immediately adjacent to the second terminal.

9. The battery recited in claim 7, wherein the protection circuit module further comprises:
    a circuit substrate;
    a protection device coupled to a lower surface of the circuit substrate;
    a first terminal affixed to the lower surface of the circuit substrate and electrically connected to the positive tap; and
    a second terminal affixed to the lower surface of the circuit substrate and electrically connected to the negative tap,
    wherein the gas sensor is composed of a pair of gas sensors affixed to a surface of the case in which one of the pair of gas sensors is immediately adjacent to the positive tap and another of the pair of gas sensors is immediately adjacent to the negative tap.

10. The battery recited in claim 1, wherein the protection circuit module further comprises;
    a first circuit unit electrically connected to the gas sensor to determine that a leakage of the electrolyte has occurred and to stop a charge/discharge operation of the battery and to forcibly discharge the battery; and
    a second circuit unit that monitors the charge/discharge state of the battery and controls the charge/discharge operation of the battery.

11. The battery recited in claim 10, wherein the first circuit unit further comprises:
    a signal amplification unit that receives and amplifies the signal from gas sensor indicating the occurrence of the electrolyte leaking;
    an electrolyte leakage determination unit electrically connected to the signal amplification unit having a comparator that compares an output voltage of the signal of the gas sensor to a reference voltage and generates an output signal according to a result of the comparison; and
    a forcible discharge unit electrically connected to the electrolyte leakage determination unit having a first switch that is turned on or off according to the output signal of the comparator and a load resistor that forms a closed circuit together with the battery according to the on/off operation of the first switch,
    wherein upon the output signal of the comparator of the electrolyte leakage determination unit changes from a first level representing a normal state to a second level representing a leakage of the electrolyte, the battery is forcibly discharged.

12. The battery recited in claim 10, wherein the second circuit unit further comprises:
a pair of external connection terminals that contact the battery to an external device;
a switching device unit formed on a current path between the pair of external connection terminals and the battery; and
a protection integrated circuit that controls the switching device unit.

13. The battery recited in claim 1, wherein the can is a case that is flexible and includes an upper case and a lower case which are sealed to contain the electrode assembly and electrolyte, a positive tap and a negative tap protrude from the case and are connected to the electrode assembly.

14. The battery recited in claim 13, further comprising:
an air tight cover having an upper cover and a lower cover to completely encapsulate the case, positive and negative taps and the protection circuit module.

15. The battery recited in claim 14, wherein the protection circuit module further comprises:
a circuit substrate;
a protection device coupled to a lower surface of the circuit substrate;
a first terminal affixed to the lower surface of the circuit substrate and electrically connected to the positive tap; and
a second terminal affixed to the lower surface of the circuit substrate and electrically connected to the negative tap,
wherein the gas sensor is composed of a pair of gas sensor affixed to the lower surface of the circuit substrate in which one of the pair of gas sensors is immediately adjacent to the first terminal and another of the pair of gas sensors is immediately adjacent to the second terminal.

16. The battery recited in claim 14, wherein the protection circuit module further comprises:
a circuit substrate;
a protection device coupled to a lower surface of the circuit substrate;
a first terminal affixed to the lower surface of the circuit substrate and electrically connected to the positive tap; and
a second terminal affixed to the lower surface of the circuit substrate and electrically connected to the negative tap,
wherein the gas sensor is composed of a pair of gas sensors affixed to a surface of the case in which one of the pair of gas sensors is immediately adjacent to the positive tap and another of the pair of gas sensors is immediately adjacent to the negative tap.

17. The battery recited in claim 14, wherein the protection circuit module further comprises;
a first circuit unit electrically connected to the gas sensor to determine that a leakage of the electrolyte has occurred and to stop a charge/discharge operation of the battery cell and to forcibly discharge the battery cell; and
a second circuit unit that monitors the charge/discharge state of the battery cell and controls the charge/discharge operation of the battery cell.

18. The battery recited in claim 17, wherein the first circuit unit further comprises:
a signal amplification unit that receives and amplifies the signal from gas sensor indicating the occurrence of the electrolyte leaking;
an electrolyte leakage determination unit electrically connected to the signal amplification unit having a comparator that compares an output voltage of the signal of the gas sensor to a reference voltage and generates an output signal according to a result of the comparison; and
a forcible discharge unit electrically connected to the electrolyte leakage determination unit having a first switch that is turned on or off according to the output signal of the comparator and a load resistor that forms a closed circuit together with the battery cell according to the on/off operation of the first switch,
wherein upon the output signal of the comparator of the electrolyte leakage determination unit changes from a first level representing a normal state to a second level representing a leakage of the electrolyte, the battery cell is forcibly discharged.

19. The battery recited in claim 17, wherein the second circuit unit further comprises:
a pair of external connection terminals that contact the battery cell to an external device;
a switching device unit formed on a current path between the pair of external connection terminals and the battery cell; and
a protection integrated circuit that controls the switching device unit.

20. The battery recited in claim 1, wherein the gas sensor is disposed on the cap plate immediately adjacent to an electrode terminal that protrudes through the cap plate, said electrode terminal is connected to a negative tap that is connected to the electrode assembly.

* * * * *